(No Model.)

P. LANGE.
ELECTRIC CLOCK MOVEMENT.

No. 343,976. Patented June 15, 1886.

WITNESSES:
K. Lipschick
L. A. Perot

INVENTOR:
Philipp Lange.

N. PETERS, Photo-Lithographer, Washington, D. C.

UNITED STATES PATENT OFFICE.

PHILIPP LANGE, OF NEW YORK, N. Y., ASSIGNOR TO EDGAR W. MOORE, OF SAME PLACE.

ELECTRIC-CLOCK MOVEMENT.

SPECIFICATION forming part of Letters Patent No. 343,976, dated June 15, 1886.

Application filed November 16, 1885. Serial No. 183,038. (No model.)

*To all whom it may concern:*

Be it known that I, PHILIPP LANGE, of the city, county, and State of New York, have invented certain new and useful Improvements in Electric-Clock Movements, of which the following is a specification.

My improvements relate to that class of electric-clock movements where the oscillation of the pendulum is maintained and the movement driven by electro-magnets, the circuits of which are in turn controlled by the pendulum; and the objects of my improvements are, first, to provide a simple and efficient impelling device for the pendulum; second, to apply the power of the electro-magnets directly to a wheel (whose shaft is geared to a set of wheels which works the hands of clock) without using an escapement or pawl; and, third, to make the working of said electric-clock movement entirely noiseless. I attain these objects by a mechanism illustrated in the accompanying drawings, in which—

Figure 2:
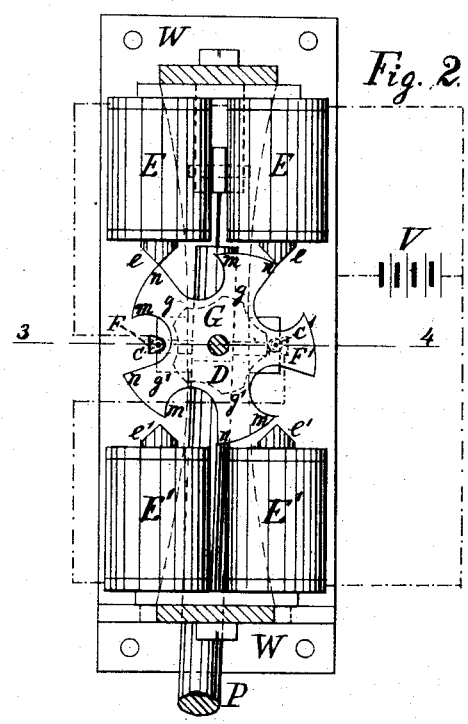
Figure 1:
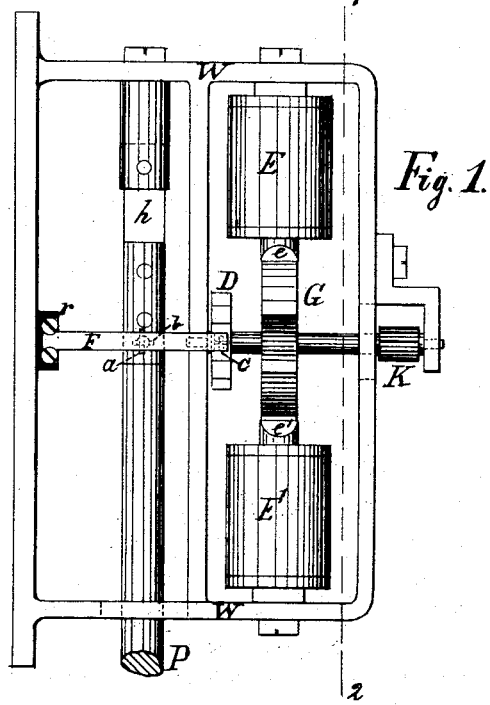
Figure 3:
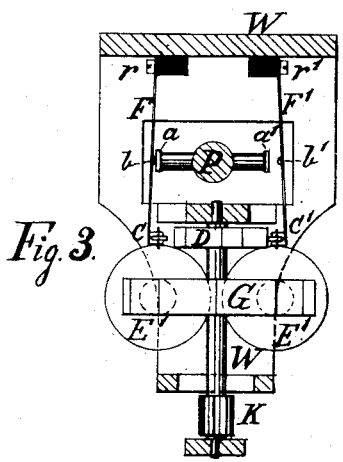
Figure 4:
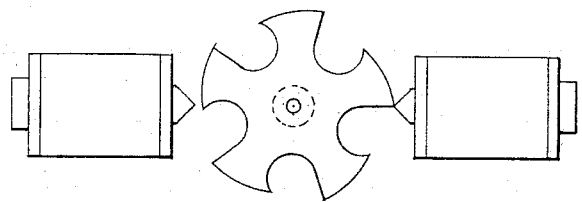
Figure 4:
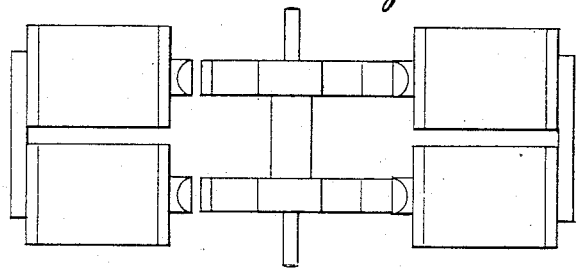

Figure 1 is a side view of the electric-clock movement; Fig. 2, a vertical section of it on line 1 2. Fig. 3 is a horizontal section on the line 3 4, Fig. 2; and Fig. 4 is an illustration of a different arrangement of electro-magnets and armature of said movement.

Similar letters refer to similar parts throughout the several views.

The pendulum P is suspended by a spring, $h$, to a frame, W, which is carrying also two electro-magnets, E E and E' E', with their pole-pieces $e\ e$ and $e'\ e'$. Between these revolves the armature-wheel G, having attached to one end of its shaft a pinion, K, which works into a set of gear-wheels moving the hands of clock, to the other end a star-wheel, D, having the same number of teeth as the armature-wheel. Against the wheel D are pressing two springs, F and F', with their rollers $c$ and $c'$, one, $c'$, being on top of one tooth when the position of the other, $c$, is between two teeth. The springs F F' are attached to insulated blocks $r\ r'$, fastened to frame W. The other ends, carrying the rollers $c\ c'$, are insulated through wheel D, which is made of hard-rubber. Attached to the springs F F' are further two platinum contacts, $b\ b'$, which are opposite two other contacts, $a\ a'$, attached to pendulum P.

V is an electric battery, one pole of it being connected to frame W, (which is in metallic connection with pendulum P,) the other to the two electro-magnets, and through these to F and F'.

If pendulum P is set in motion and swings to the left, as shown in Fig. 2, it will touch with its contact $a$ the contact-piece $b$, attached to spring F, hereby closing the circuit of battery V through the electro-magnet E E, which now will attract the two teeth $g\ g$ of the armature-wheel G as near as possible to the pole-pieces $e\ e$. By this rotary motion the star-wheel D, which is rigidly attached to the shaft of armature-wheel G, will also be moved one step, hereby raising the roller $c'$ of spring F' to the top of its tooth, so increasing the tension of said spring. This motion of wheel D also moves the tooth on which the roller $c$ of spring F was resting, leaving as only support of this spring the pendulum-contact $a$, upon which it will now exert a slight pressure, enough to give the pendulum a new impulse. This position is shown in Figs. 1, 2, and 3 of drawings. The pendulum P will now swing back to the right, followed by spring F, until its roller $c$ touches the bottom of the groove of wheel D. Before it does this pendulum-contact $a'$ touches the contact $b'$ of spring F', so closing the circuit through electro-magnet E' E' before that through E E is broken. This happens as soon as spring F is arrested by wheel D. Now, the current of the battery V will only pass through the wire of electro-magnet E' E', which will now attract the teeth $g'\ g'$ of armature G as close as possible to the pole-pieces $e'\ e'$, hereby moving again the wheel D for one step. This produces the same effect as before described—spring F' gives an impulse to pendulum P, now swinging again to the left, while the tension of spring F is increased, being moved to the top of a tooth of wheel D. At each step the armature G comes to a positive stop without touching the pole-pieces of the electro-magnets, this being due to that peculiar shape of the pole-pieces and of the armature-teeth which is shown in Figs. 1, 2, and 4.

The pole extensions $e\ e\ e'\ e'$ of the electro-magnets are formed like knife-edges, lying parallel to the shaft of armature-wheel G, and having all the same distance from the center of said shaft. The edges $n$ of the teeth of armature G are extending to a circle almost touching the pole-extensions of the electro-magnets; the other edges $m$, however, lie in a circle of considerable smaller diameter, so that the distance between the pole-pieces $e\ e$ $e'\ e'$ and the tooth-surfaces $m\ n$ is gradually decreasing while the armature is revolving through the field of the magnets.

I prefer to arrange the electro-magnets and armature as shown in Figs. 1, 2, and 3; but it is quite evident that the same device could be carried out in many different ways. Fig. 4 shows an arragement where the single armature-wheel is replaced by two of exactly the same shape, which are connected through an iron yoke, so forming one armature. Another way is to put the shaft of armature parallel to the cores of the magnets, these acting upon the sides of the armature-wheel. My device could also be carried out by giving to the teeth of the armature the shape of the pole-pieces, and forming the pole-pieces like the armature-teeth heretofore described. The number of the armature-teeth could also be changed to any convenient number.

Having thus described my invention, what I claim as new, and desire to secure by Letters Patent, is—

1. In an electric-clock movement, the combination of a pendulum, P, the two impelling-springs F F', the rollers $c\ c'$, and the star-wheel D, connected to armature G of electro-magnets E E and E' E', straining the springs to impart impulses to the pendulum, substantially as described.

2. In an electric-clock movement, the combination of a pendulum, P, the contacts $a\ a'$, the impelling-springs F F', with the contacts $b\ b'$ and the rollers $c\ c'$, the insulated star-wheel D, which moves with the armature G of the electro-magnets E E and E' E', and the battery V, the circuit of which is controlled by the pendulum, substantially as described.

3. In an electric-clock movement, the combination of two electro-magnets, E E and E' E', their pole-pieces $e\ e$ and $e'\ e'$, and a revolving armature, G, having teeth $g$ with surfaces $m\ n$, substantially as described.

In testimony that I claim the foregoing as my invention I have signed my name, in presence of two witnesses, this 9th day of November, 1885.

PHILIPP LANGE.

Witnesses:
L. A. PERROT,
J. T. DEMPSTER.